United States Patent
Dewynter-Marty et al.

(10) Patent No.: US 6,956,981 B2
(45) Date of Patent: Oct. 18, 2005

(54) LONG BASE, STRETCHED FIBER-OPTIC BRAGG NETWORK EXTENSOMETER AND PRODUCTION METHOD FOR SAME

(75) Inventors: Véronique Dewynter-Marty, Gif sur Yvette (FR); Stéphane Rougeault, Sceaux (FR); Pierre Ferdinand, Houilles (FR)

(73) Assignee: Commissariat a l'Energie Atomique, Paris (FR)

( * ) Notice: Subject to any disclaimer, the term of this patent is extended or adjusted under 35 U.S.C. 154(b) by 181 days.

(21) Appl. No.: 10/472,762

(22) PCT Filed: Apr. 4, 2002

(86) PCT No.: PCT/FR02/01174
§ 371 (c)(1),
(2), (4) Date: Oct. 3, 2003

(87) PCT Pub. No.: WO02/082010
PCT Pub. Date: Oct. 17, 2002

(65) Prior Publication Data
US 2004/0114850 A1 Jun. 17, 2004

(30) Foreign Application Priority Data
Apr. 4, 2001 (FR) .......................................... 01 04563

(51) Int. Cl.⁷ ............................................. G01B 11/16
(52) U.S. Cl. ............................................ 385/13; 356/32
(58) Field of Search ....................... 385/13, 37; 356/32; 250/227.14; 73/800

(56) References Cited

U.S. PATENT DOCUMENTS

| | | | |
|---|---|---|---|
| 5,367,589 A | * 11/1994 | MacDonald et al. | 385/37 |
| 5,594,819 A | 1/1997 | Narendran et al. | |
| 5,942,750 A | 8/1999 | Sannerhaugen et al. | |
| 6,307,990 B1 | * 10/2001 | Carberry et al. | 385/37 |
| 6,768,825 B2 | * 7/2004 | Maron et al. | 385/13 |
| 6,776,045 B2 | * 8/2004 | Fernald et al. | 73/705 |

FOREIGN PATENT DOCUMENTS

| | | |
|---|---|---|
| WO | 99/32862 | 7/1999 |
| WO | 00/60312 | 10/2000 |

* cited by examiner

*Primary Examiner*—Akm Enayet Ullah
*Assistant Examiner*—Jerry T. Rahll
(74) *Attorney, Agent, or Firm*—Oblon, Spivak, McClelland, Maier & Neustadt, P.C.

(57) ABSTRACT

An extensometer including a base, a tensioned optical fiber, and a Bragg grating. The extensometer relates particularly to monitoring of structures. Part of the optical fiber containing the Bragg grating is arranged in a tube. This part is tensioned between the two ends of the tube. The ends of this part are fixed to the ends of the tube, and the tube is rigidly fixed to a host material.

10 Claims, 3 Drawing Sheets

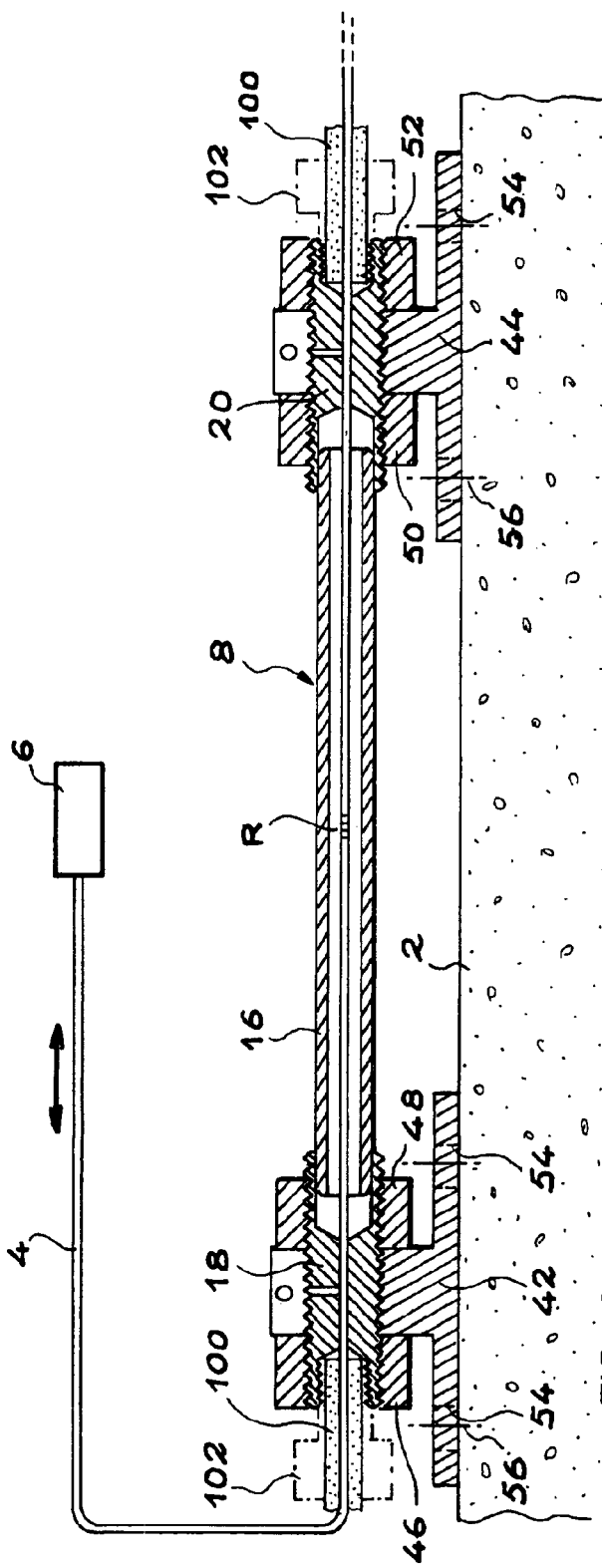
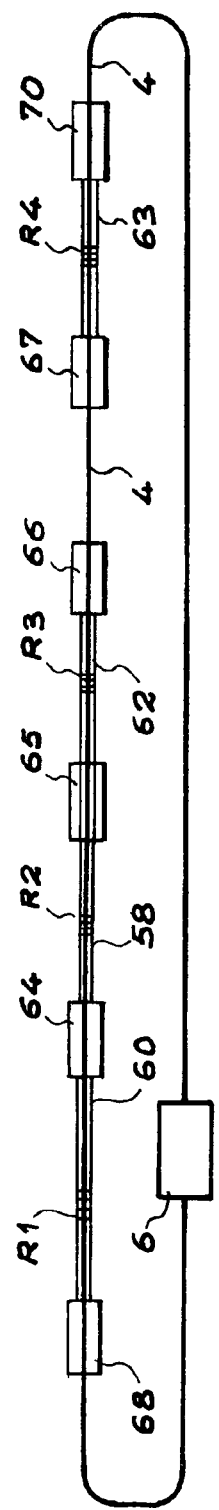
FIG. 2
FIG. 3

LONG BASE, STRETCHED FIBER-OPTIC BRAGG NETWORK EXTENSOMETER AND PRODUCTION METHOD FOR SAME

TECHNICAL FIELD

This invention relates to an extensometer using an optical fiber that comprises at least one Bragg grating and a process for manufacturing this extensometer.

It is becoming more and more necessary to inspect aging of bridges, and more generally of a large number of civil engineering works and infrastructures. Most such concrete and steel structures are subjected to severe environmental conditions (resulting from the climate, chemical attacks and continuously increasing traffic) that explain their premature aging. Therefore, precise and reliable monitoring means, obviously with a life comparable with the life of the structures being monitored, must be provided for maintenance and public safety reasons.

Several physical parameters related to aging or degradation of these structures are concerned. For example, there are measurements of the pH, chemical composition, deformation and strain in the materials from which these bridges are composed, and detection and monitoring of cracks.

Within the context of this invention, we are particularly interested in measurements of deformations and detection and monitoring of the cracking state of a structure.

Measurements of deformations and elongations of large structures like those encountered in civil or geotechnical engineering (for example mines and building sites) are now made using various sensors, for example extensometers with vibrating cords or inductive extensometers installed directly on these structures. Other contact free techniques (for example using ultrasound or optical means operating with visible light or lasers) are also known.

Note that conventional instruments (sensors and also the associated electronic means) installed on structures are frequently affected by lightning. The latter damages them and makes then inoperative, or even irreplaceable, if these sensors and electronic means are embedded in the monitored structures.

Let us mention here and now that this invention proposes to use the metrological properties of Bragg gratings that can be written in the core of optical fibers, preferably single mode fibers, and then to adapt these fibers by the use of mechanical means and original attachment points, so that they are used as extensometers in various domains, particularly civil engineering, public works and geotechnical engineering.

Therefore, this invention proposes an innovative extensometer that can be used to make tension and compression measurements and for the detection and monitoring of cracks.

Applications and uses of this invention relate to extensometry in civil engineering, public works and geotechnical engineering, for example to monitor road or railway bridges or viaducts, dams for hydroelectric power stations, nuclear reactor buildings and cooling towers associated with these reactors, miscellaneous buildings, tunnels and mines, rock movements and ground movements, or to check land or submarine seismic areas, buried pipes, pipelines, "riser" pipes, dikes and offshore platforms.

STATE OF PRIOR ART

It is known how a Bragg grating can be photo-inscribed in the core of a photo-sensitive and generally single mode optical fiber. This Bragg grating consists of a spatial modulation of the optical index of the core of the fiber for which the period $\Lambda$, in other words the pitch of the grating, defines the spectral wavelength of filtering in transmission, called the "Bragg wavelength" and denoted $\lambda_B$, according to the phase match that forms the Bragg condition and that is written:

$$\lambda_B = 2 \cdot n_{\mathit{eff}} \cdot \Lambda \qquad (1)$$

where $n_{\mathit{eff}}$ is the effective index of guided mode.

When the Bragg grating is deformed, the Bragg matching condition is satisfied at a different wavelength. The spectral signature of the Bragg grating is modified, as a function of an elongation according to a first order linear law, and it satisfies the following equation:

$$\frac{\Delta \lambda_B}{\lambda_B} = (1 - p_e)\varepsilon = \left(1 - \frac{n^2 \mathit{eff}}{2}(p_{12}(1-v) - p_{11}v)\right)\varepsilon \qquad (2)$$

where $\varepsilon$ is the longitudinal deformation along the axis of the optical fiber that is usually made of silica, $p_e$ is the photo-elastic constant of silica, $p_{11}$ and $p_{12}$ are elasto-optic coefficients and $v$ is the Poisson's ratio of silica.

In extensometers conform with this invention, the properties of Bragg gratings and optical fibers have properties as follows:

- the use of optical fibers makes extensometers insensitive to electromagnetic disturbances, lightning or electromagnetic variations that do not have any effect on light transmission,
- the intrinsic properties of Bragg gratings in terms of transmission or spectral reflection are stable with time in an environment like buildings and public works,
- Bragg gratings remain stable at high temperatures of several hundred °C.,
- they may be spectrally multiplexed, in series or in various network architectures or typologies, so that new extensometers can be connected to the acquisition and measurement systems,
- when they are used with instruments to make spectral measurements, deformations are independent of the power of the signal and any losses on measurement lines (for example due to poor reproducibility of connections and curves in the optical fibers), which is an important advantage in making long term monitoring measurements.

Various extensometers that use optical fibers on which Bragg gratings are placed are already known.

Normally, Bragg gratings are glued onto supports acting as proof bodies, or directly onto concrete reinforcing bars or prestressing cables. Metal proof bodies with this type of instrumentation can be embedded in concrete.

Further information about this subject is given in the following document:

[1] V. Dewynter-Marty, S. Rougeault, P. Ferdinand, D. Chauvel, E. Toppani, M. Leygonie, B. Jarret and P. Fenaux, Concrete strain measurements and crack detection with surface-mounted and embedded Bragg grating extensometers, 12$^{th}$ International Conference on Optical Fiber Sensors, 28–31 October 1997, USA, pages 600–603.

Bragg gratings may be embedded within composite bars, based on the same solid transducer principle.

For example, further information about this subject is given in the following document:

[2] Extensomètre à réseau de Bragg et procédé de fabrication de cet extensomètre, invention by S. Magne, V. Dewynter-Marty, P. Ferdinand and M. Bugaud, French patent application No. 99 04084, Apr. 1, 1999 corresponding to International application PCT/FR00/00806, Mar. 30, 2000.

Means of questioning Bragg gratings are also known and can be used with the extensometer according to this invention. These means are based on spectral demultiplexing. Measurement line spectra (if the sensors are multiplexed) are obtained using components such as Fabry-Perrot scanning cavities and can be used to analyze spectral offsets of Bragg gratings at different frequencies, and thus use their sensitivities to calculate variations in the physical parameter(s) considered (for example deformations, temperatures or pressures).

Means which use spectral filters for monitoring Bragg grating sensors are also known.

There is a disadvantage with known extensometers: due to the structure of these extensometers, their base length cannot exceed more than about a meter.

PRESENTATION OF THE INVENTION

The purpose of this invention is to overcome the disadvantage mentioned above by proposing an extensometer that comprises an optical fiber provided with at least one Bragg grating, the measurement base for this extensometer being between a few tens of centimeters to a few meters, or even a few tens of meters.

More precisely, the purpose of this invention is an extensometer comprising:

an optical fiber, in which at least one Bragg grating is formed, and, at least one proof body that is intended to be rigidly fixed to a host material and that surrounds part of the optical fiber containing this Bragg grating, any deformation of the host material being thus transmitted to this Bragg grating through the proof body, this Bragg grating then being capable of modifying a light propagating in the fiber, the deformation of the host material being determined from this modified light, this extensometer being characterized in that the proof body comprises a tube in which the part of the optical fiber containing the Bragg grating is placed, the two ends of this part being fixed to the corresponding two ends of this tube and this part being tensioned between these two ends of the tube.

According to a preferred embodiment of the extensometer according to the invention, the proof body also comprises two end pieces fixed to the corresponding two ends of the tube and the part of the fiber is tensioned between these two end pieces.

According to one particular embodiment of the extensometer according to the invention, the two end pieces are metallic, the optical fiber is metallized and the two ends of the part of this fiber are soldered to the corresponding two end pieces.

According to a second particular embodiment, the two ends of the part of the fiber are glued to the corresponding two end pieces.

Preferably, the two ends of the tube are soldered to the corresponding two end pieces.

Preferably, a metal tube and two metal end pieces are used and the two ends of the tube are soldered to the corresponding two end pieces by a tin solder.

In a first particular embodiment of the invention, the proof body is intended to be embedded in the host material and the two end pieces are provided with two corresponding means of anchorage into the host material.

According to a second particular embodiment, the proof body is intended to be fixed to the surface of the host material and the two end pieces are provided with two corresponding means for attachment or gluing to this surface of the host material.

In one particular embodiment of the invention, the extensometer comprises a plurality of proof bodies mounted in series.

This invention also relates to a process for manufacturing the extensometer according to the invention, in which the part of the optical fiber between the two ends of the tube is tensioned and the two ends of this part are fixed to the two ends of the tube.

BRIEF DESCRIPTION OF THE DRAWINGS

This invention will be better understood after reading the description of example embodiments given below, for information purposes only and in no way limitative, with reference to the appended drawings, wherein:

FIG. 2 is a diagrammatic longitudinal sectional view of a second particular embodiment of the extensometer according to the invention, FIG. 3 diagrammatically illustrates networking of several extensometers according to the invention (four extensometers in this example), and FIG. 4 diagrammatically illustrates an example of a device for installing an extensometer according to the invention.

DETAILED PRESENTATION OF PARTICULAR EMBODIMENTS

Figure 1:
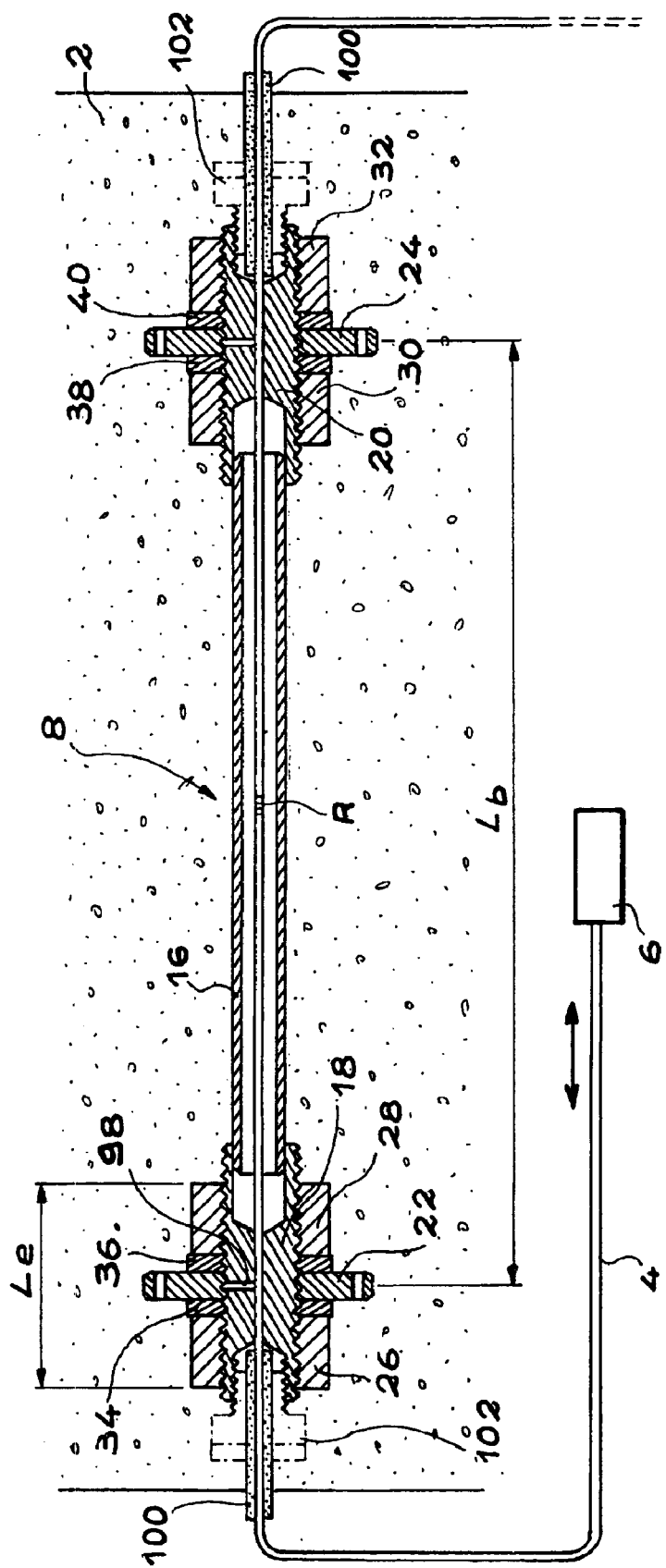
FIG. 1 is a diagrammatic longitudinal sectional view of a first particular embodiment of the extensometer according to the invention.

Extensometers according to the invention that are diagrammatically shown in longitudinal cross section in FIGS. 1, 2 and 3, will be used to measure deformations (contractions or expansions) of a host material which in these examples is a concrete structure.

Each of these extensometers comprises an optical fiber containing at least one Bragg grating, and the fiber containing the Bragg grating is pretensioned with an elongation greater than the maximum allowable compression, so that elongation and contraction deformations can be measured.

Thus for concrete, the compression range is of the order of 2500 $\mu$ deformation (0.2%). It can be seen that it is quite possible to pretension the fiber to more than this value (for example 0.5%).

FIGS. 1 and 2 show the concrete part 2 of this structure for which deformations are to be studied using one of these extensometers.

Each extensometer comprises a preferably single mode optical fiber 4, for example made of silica.

At least one Bragg grating is formed in the core of this optical fiber (by photo-inscription) (only one Bragg grating R in FIGS. 1 and 2, and four Bragg gratings R1, R2, R3 and R4 in FIG. 3).

FIGS. 1 to 3 show measurement means 6 used to "question" the Bragg grating(s) and measure the deformations applied to the concrete.

These measurement means are designed to send light with a given wavelength into the optical fiber 4 when there is only one Bragg grating, and light with different wavelengths when there are a plurality of Bragg gratings (for example one wavelength for each Bragg grating).

Any deformation of the concrete is transmitted to a Bragg grating through the proof body 8 (FIGS. 1 and 2) included in the extensometer and that we will describe in more details later.

This Bragg grating then modifies the light that corresponds to it and this light returns to the measurement means 6 through the optical fiber and concrete deformation is determined by these measurement means starting from the light thus modified.

In the example shown, the measurement means 6 are connected to a single optical fiber, namely optical fiber 4 on which the Bragg grating R is installed.

Nevertheless, the measurement means 6 may comprise an optical switch to address one among N optical fibers (N>1), so as to connect the addressed fiber to the measurement means 6, at a given moment. Therefore, this optical switch provides a means of alternating the query (send and retrieve light) from a Bragg grating or lines of Bragg grating sensors, this query possibly taking place alternately from one end of the optical fiber and then from the other end of the same fiber, and so on as shown in FIG. 3. This embodiment makes the system with one or several extensometers more reliable, enabling this system to remain operational even if the fiber is accidentally cut.

However, in a simpler embodiment (not shown), the Bragg grating(s) can be questioned from a single end of the optical fiber, the other end being free, in other words not connected to the extensometer.

In another embodiment (not shown), light can be sent into the Bragg grating(s) through one end of the optical fiber and this light can be recovered, possibly modified, from the other end of the optical fiber, to measure deformations of the concrete.

Now we will return to FIGS. 1 and 2. The proof body 8 of the extensometer according to the invention as seen in FIGS. 1 and 2 comprises a central tube 16 and two end pieces 18 and 20 fixed to the corresponding two ends of this tube.

The part of the optical fiber 4, in the core of which the Bragg grating R is formed, is free inside this tube 16 and is tensioned inside this tube.

Another fiber, not shown and not tensioned, may possibly be attached to this fiber 4 so as to measure the temperature.

The two ends of the part of the fiber on which the Bragg grating is located are fixed to the inside of the corresponding two end pieces 18 and 20, and this part of the fiber 4 is tensioned between the two end pieces.

This fiber is tensioned when the extensometer is being made, so that the extensometer can be used to make deformation measurements in tension and in compression along its longitudinal axis (axis of tube 16).

When one end piece moves relative to the other end piece, the Bragg grating is subjected to a measurable deformation.

There are three possibilities for attaching the part of the fiber 4 located in the tube:

1) If the fiber is metallized in advance (in a known manner), this part can be soldered in the end pieces.
2) If the fiber is provided with only one mechanical jacket or protective jacket, usually made of polymer, or if it is not provided with such a jacket, the part of the fiber can be glued in the end pieces.
3) In another particular embodiment (not shown), a mechanical clamping or capstan system can be provided for attachment of part of the fiber 4 in the tube 16.

It is possible to choose the stiffness of the proof body 8 and therefore the stiffness of the tube 16 as a function of the host material 2 in which this tube will be fitted.

The tube 16 is metallic, for example made of nickel-plated stainless steel, and is soldered at its two ends to the two end pieces also made of stainless steel in the example considered. The essential function of this soldering is to maintain pretension of the fiber when the extensometer is put in storage and is put into place in the structure to be monitored.

The fiber pretension can vary from a few grams to a few kilograms and depends on the required measurement range.

The mechanical strength of the soldered connections between the tube and the end pieces can be varied, as a function of the area to be soldered and the quantity of added material.

The stiffness of the extensometer may be low, to avoid introducing constraints to deformation of the structure, or it may be more rigid, for example so that its equivalent Young's modulus is very similar to the Young's modulus of the host material. This is done using a "flexible" solder, preferably a solder like that used in electronics.

The low stiffness of the extensometer tube 16 enables the use of long lengths for this extensometer, varying up to a few meters or even more.

All that is necessary is to adapt the length of the central tube 16 (note that this type of measurement base is not available with vibrating cords for which the limit of the measurement base is now about 20 cm), while maintaining low intrusiveness (unlike "solid" extensometers).

"Solid" or "rigid" extensometers for which the Bragg grating is fixed to a metallic rod over its entire length, firstly have greater resistance to deformations of the structure to be monitored and consequently are very intrusive, and secondly they have to be sized to prevent the rod from buckling during operation in compression; as the length of the measurement base increases, the diameter of the rod also increases according to the basic principles of the strength of materials. Therefore it would be difficult to use these "rigid" extensometers to make measurement bases more than about twenty cm long.

On the contrary, measurement bases with an extensometer according to the invention are typically between about 0.1 m and several meters. All that is necessary is to adapt the length of the central tube 16.

Several adaptations of the basic configuration that has just been described (central tube 16, fiber 4 with Bragg grating R and two end pieces 18 and 20) are possible, enabling different applications.

In the example in FIG. 1, the extensometer is installed in a structure during construction of this structure or after coring.

In this case, an anchor flange 22 or 24 is added to each end piece 18 or 22, the anchor flange being screwed onto this end piece using two nuts 26-28 or 30-32 that trap the corresponding flange through two washers 34-36 or 38-40, as can be seen in FIG. 1.

In the example in FIG. 2, the extensometer is installed on the surface of an existing bridge made of concrete 2. In this case, the end pieces 18 and 20 are fixed to the corresponding jumpers or clamps 42 and 44 through two nuts 46-48 or 50-52 trapping this jumper or clamp.

In the case shown in FIG. 1, the two flanges define the deformation integration base.

In the case shown in FIG. 2, the two jumpers or clamps define this integration base.

In FIG. 2, each jumper or clamp is provided with holes 54 designed for attachment to the bridge using the appropriate means such as screws symbolized by chain dotted lines 56.

Instead, the two clamps could be bonded to the surface of the bridge.

Note that in the examples in FIGS. 1 and 2, the end of the fiber 4 that is shown as not being connected, could be free or it could be connected to another extensometer, or even connected to the measurement means 6.

The example in FIG. 3 diagrammatically illustrates how several extensometers according to the invention can be put in a network.

Four extensometers are used in this example, using the same optical fiber 4 and comprising Bragg gratings R1, R2, R3 and R4 inscribed at different wavelengths on this fiber 4.

The first three extensometers are placed in series with common attachment points in pairs. The fourth extensometer is located further away; an extension of the fiber 4 separates it from the other three extensometers.

The result is an assembly that can be used to make distributed measurements.

In the example in FIG. 3, the three extensometers in series use three proof bodies comprising three tubes with different lengths.

One of these tubes, forming a central tube 58, is connected to the other tubes 60 and 62 through two central end pieces 64 and 65. These other two tubes are also provided with two terminal end pieces 68 and 66 at their ends furthest from the tube 58.

The fourth extensometer uses a tube 63 provided with two end pieces 67 and 70 at its ends.

The optical fiber 4 passes through the end pieces 68, 64, 65, 66, 67 and 70 and the tubes 60, 58, 62 and 63. One of the Bragg gratings R1 is located between the terminal end piece 68 and the central end piece 64. The Bragg grating R2 is located between the two central end pieces 64 and 65, and the third Bragg grating R3 is located between the central end piece 65 and the terminal end piece 66. The fourth Bragg grating R4 is located between the end pieces 67 and 70. The optical fiber is tensioned between adjacent end pieces 68-64, 66-66 and 67-70 and is fixed in these end pieces.

In one example (not shown), two identical extensometers are mounted in series, corresponding to two measurement bases each 0.5 m long. Two tubes with a common end piece are then used, while an end piece is placed at each of the other two ends of these tubes. An optical fiber on which two Bragg gratings are installed is then used and this fiber is tensioned in the two tubes, between the end pieces.

The deformation measurement range is defined for each extensometer by applying and controlling the prestressing. For example, the pretension necessary for an extensometer to operate in compression within a deformation range varying from −1000 µm/m to −3000 µm/m is typically more than 300 g for a silica fiber with a diameter of 125 µm.

Consequently, the measurement range is adaptable, particularly in compression, as a function of the pretension applied when the extensometer according to the invention is being manufactured.

We will now consider a process for manufacturing an extensometer according to the invention. We will firstly describe an example of an extensometer assembly bench. This assembly bench provides a means of making extensometers with excellent metrological reproducibility, particularly for application of prestresses necessary for compression measurements.

Figure 4:
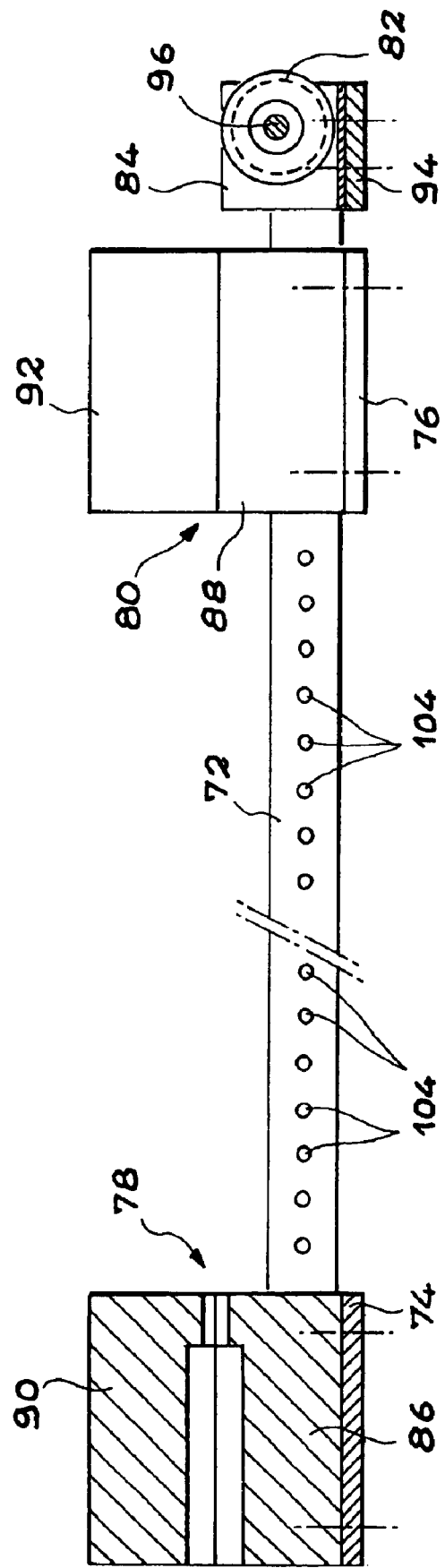

This example of the installation bench is diagrammatically shown in FIG. 4 and comprises an assembly rod 72, plates 74 and 76, anchor end pieces 78 and 80, a pulley 82 and a pulley support 84, and each anchor end piece 78 or 80 comprises an anchor support 86 or 88 and an anchor cover 90 or 92, and a plate 94 can also be seen under the pulley support base. The spindle of this pulley is marked with reference 96.

All these parts are assembled as can be seen in FIG. 4.

The assembly rod 72 supports the assembly and keeps the various components coaxial as a function of the chosen measurement base.

The plates 74-76 or 94 support anchors or the pulley support. These plates are fixed under the assembly rod 72.

The end pieces of extensometers are placed in the two anchor supports during assembly.

The optical fiber is put into position around the pulley ready for pretensioning.

We will now describe how an extensometer is made according to the invention.

This example relates to manufacturing of a basic extensometer comprising an optical fiber containing a single Bragg grating, one tube and two end pieces.

In step 1, the two metallic end pieces are cleaned. These end pieces degreased for this purpose, for example using ethane trichloro 111.

In step 2, the outside surface of the optical fiber is cleaned. This is done by carefully cleaning this optical fiber with acetone on the portions on which it is to be glued or soldered.

In step 3, areas that will not be glued or soldered in the end pieces are identified and marked on the fiber. If the measurement base of the extensometer is denoted $L_b$ (FIG. 1), and the length of each end piece is denoted $L_e$ (FIG. 1), two marks will be made on the fiber at distances $L_b/2+L_e+1$ cm on each side of the position of the Bragg grating. These marks will help to correctly position this Bragg grating at the center of the tube.

In a step 4, the various elements are slid onto the fiber. These elements, namely the left end piece, the tube and the right end piece with the threads facing outwards, are slid onto this fiber, in this order.

In a step 5, the assembly bench is adapted to the measurement base $L_b$ of the extensometers to be made and the two plates 74 and 76 are put into place fixed to the anchor supports on two heating plates (not shown).

In a step 6, the separate elements of the extensometer are positioned on the assembly bench. The two end pieces are placed in the corresponding supports of the installation bench and the extensometer tube is adjusted so that this tube is not stopped due to contact in an end piece. The fiber is slid so that the two marks on this fiber can be seen on the outside of the two end pieces. The right end piece is the end piece that is near the pulley.

Subsequent steps are different depending on whether or not the optical fiber is metallized.

The gluing procedure corresponding to steps 7a to 15a described below are applicable for an optical fiber that only has a polymer coating. We will describe the end of the process for a metallized fiber later on, and in this case the corresponding steps will be 7b to 9b.

Step 7a is a step for preparation of the adhesive that will be used for gluing. After mechanical strength tests and measurements to confirm lack of creep under load at different temperatures, we chose a dual-component epoxy glue as the adhesive to glue the fiber into its end pieces. The two components of this adhesive, namely the resin and the hardener, are weighed and mixed in a previously cleaned dish.

Step 8a fluidizes the adhesive. This adhesive is heated to a temperature of 40° C. to make it fluid, but without beginning polymerization. It can thus be drawn in using a syringe.

Step 9a consists of injecting the resin into the left end piece. This resin is injected into this left end piece through the hole 98 (FIG. 1) that is machined at the center of this end piece, from its surface.

Injection is stopped when resin begins to appear at the exit from the end piece.

Step 10a is a resin polymerization step. An anchor cover is placed on the end piece to achieve good thermal conductivity. A temperature probe is placed in the threaded part of the end piece and the temperature is increased up to 105° C. for two hours, and then up to 175° C. for four hours, and then annealing is done at 230° C. for 16 hours. The polymerization cycle depends on the resin used.

Step 11a is a step in which the metal tube is soldered into the left end piece. This end piece and the tube are heated throughout, to the solder melting temperature. A tin solder known for use in electronics is used. The solder is melted and deposited in the hole of the end piece machined for this purpose, and on the end of the tube.

Step 12a is a step in which the metal tube is soldered in the right end piece. This procedure is the same as in step 11a.

Step 13a is a fiber pretensioning step. The right end of the fiber is passed around the pulley, and a previously calibrated mass is suspended from it, to pretension the fiber. For a conventional single mode fiber for which the optical cladding diameter is 125 $\mu$m, a mass of a 100 g typically induces a pretension of 1000 $\mu$m/m.

Pretension is applied in the following steps.

Step 14a consists of injecting resin into the right end piece. The procedure is the same as in step 9a.

Step 15a polymerizes the resin injected into the right end piece. The procedure is the same as in step 10a.

The basic extensometer is then complete, if the coating is a polymer.

If the fiber is metallized, the end of the manufacturing process consists of steps 7b to 10b.

In step 7b, the fiber is soldered into the left end piece, and this end piece is soldered into the tube, at the same time.

In step 8b, the fiber is pretensioned. The procedure is the same as in step 13a.

In step 9b, the fiber is soldered into the right end piece, and this end piece is soldered into the tube, at the same time.

The basic extensometer with the metallized fiber is then complete.

Step 16, consists of putting the fiber protective cables 100 into place (FIG. 1) and is applicable regardless of whether or not the fiber is metallized.

These protective cables 100 are slid into place to protect the fiber that projects from each end of the end pieces. Each cable 100 is fixed to the corresponding end piece using a gland 102 screwed to the inside of the end piece onto the threaded part provided for this purpose.

Let us give additional information concerning the assembly of an extensometer using the assembly bench in FIG. 4.

This FIG. 4 shows that holes 104 are provided at a uniform spacing from each other along the entire length of the rod 72. These holes 104 are used to modify the distance between two consecutive end pieces as a function of the length of the tube and the chosen measurement base.

What is claimed is:

1. Extensometer comprising:

an optical fiber, in which at least one Bragg grating is formed; and at least one proof body configured to be rigidly fixed to a host material and that surrounds part of the optical fiber containing the Bragg grating, wherein any deformation of the host material is transmitted to the Bragg grating through the proof body, the Bragg grating configured to modify a light propagating in the optical fiber, the any deformation of the host material being determined from the modified light, and wherein the proof body comprises a tube in which the part of the optical fiber containing the Bragg grating is placed, two ends of the part being fixed to corresponding two ends of the tube and the part being tensioned between the two ends of the tube.

2. Extensometer according to claim 1, wherein the proof body further comprises two end pieces fixed to corresponding of the two ends of the tube, and wherein the part of the optical fiber is tensioned between the two end pieces.

3. Extensometer according to claim 2, wherein the two end pieces are metallic, the optical fiber is metallized, and the two ends of the part of the optical fiber are soldered to the corresponding two end pieces.

4. Extensometer according to claim 2, wherein the two ends of the part of the optical fiber are glued to the corresponding two end pieces.

5. Extensometer according to claim 2, wherein the two ends of the tube are soldered to the corresponding two end pieces.

6. Extensometer according to claim 5, wherein the tube and the two end pieces are metallic and the two ends of the tube are soldered to the corresponding two end pieces by a tin solder.

7. Extensometer according to claim 2, wherein the proof body is configured to be embedded in the host material and the two end pieces are provided with two corresponding means for anchoring into the host material.

8. Extensometer according to claim 2, wherein the proof body is configured to be fixed to a surface of the host material and the two end pieces are provided with two corresponding means for attaching or gluing to the surface of the host material.

9. Extensometer according to claim 1, comprising a plurality of proof bodies mounted in series.

10. Process for manufacturing the extensometer according to claim 1, wherein the part of the optical fiber between the two ends of the tube is tensioned and the two ends of the part are fixed to the two ends of the tube.

* * * * *